United States Patent [19]

Agar

[11] 4,245,448
[45] Jan. 20, 1981

[54] MODIFIED SUSPENSION ASSEMBLY FOR PARTITION PANEL

[75] Inventor: Robert S. Agar, Markham, Canada

[73] Assignees: Robert S. Agar, Inc., Markham; Thorsell Holdings Ltd., Edmonton; Mudlake Holdings Ltd., Calgary, all of Canada

[21] Appl. No.: 66,084

[22] Filed: Aug. 13, 1979

[30] Foreign Application Priority Data

Sep. 1, 1978 [CA] Canada .................................. 310542

[51] Int. Cl.³ .............................................. E04B 5/52
[52] U.S. Cl. ........................................ 52/489; 52/511; 52/512; 52/DIG. 6
[58] Field of Search ................... 52/489, DIG. 6, 713, 52/765, 511, 512

[56] References Cited

U.S. PATENT DOCUMENTS

| | | | |
|---|---|---|---|
| 1,810,597 | 6/1931 | Corwin | 52/489 |
| 3,948,011 | 4/1976 | Price et al. | 52/511 X |
| 3,950,904 | 4/1976 | Littman | 52/511 X |
| 4,128,979 | 12/1978 | Price | 52/481 X |

Primary Examiner—Carl D. Friedman
Attorney, Agent, or Firm—Ernest Peter Johnson

[57] ABSTRACT

A suspension assembly is provided for suspending gypsum board panels from a horizontal support member. The plate portion of the suspension assembly has panel piercing tangs of a novel twisted conformation projecting rearwardly to affix the plate to the panel. A narrow neck portion of the plate forms channel means to receive the upper portion of a separate suspension clip. The lower portion of the clip is inclined outwardly to engage the horizontal support member. A plurality of transverse lines of weakness comprising slots and notch means extending substantially across the width of the neck portion of the plate are designed such that when the gypsum board panel is suspended from the support member, the load applied between the clip and the plate causes the neck portion of the plate to bend outwardly from the panel along said lines of weakness, while the upper and lower plate portions remain affixed to the panel.

3 Claims, 6 Drawing Figures

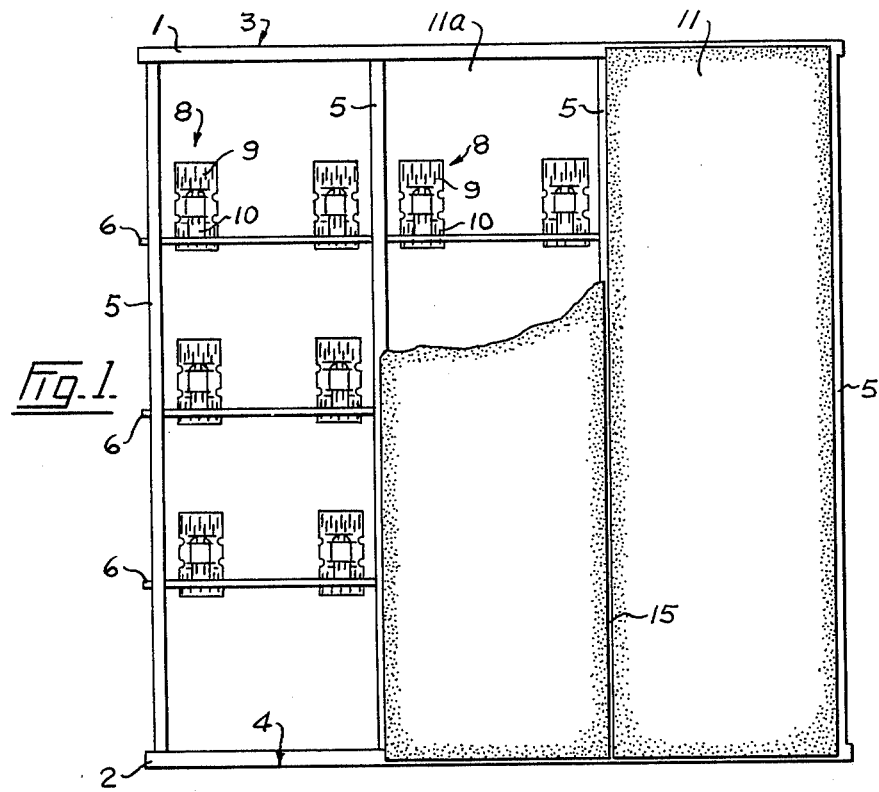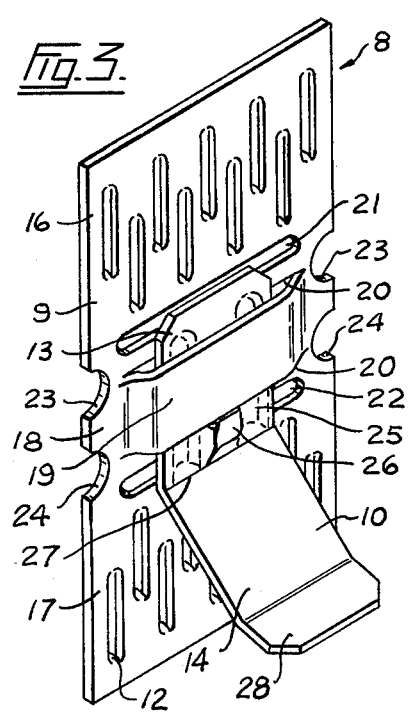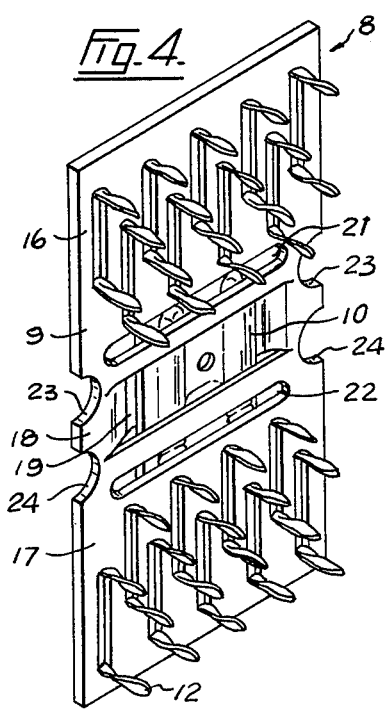

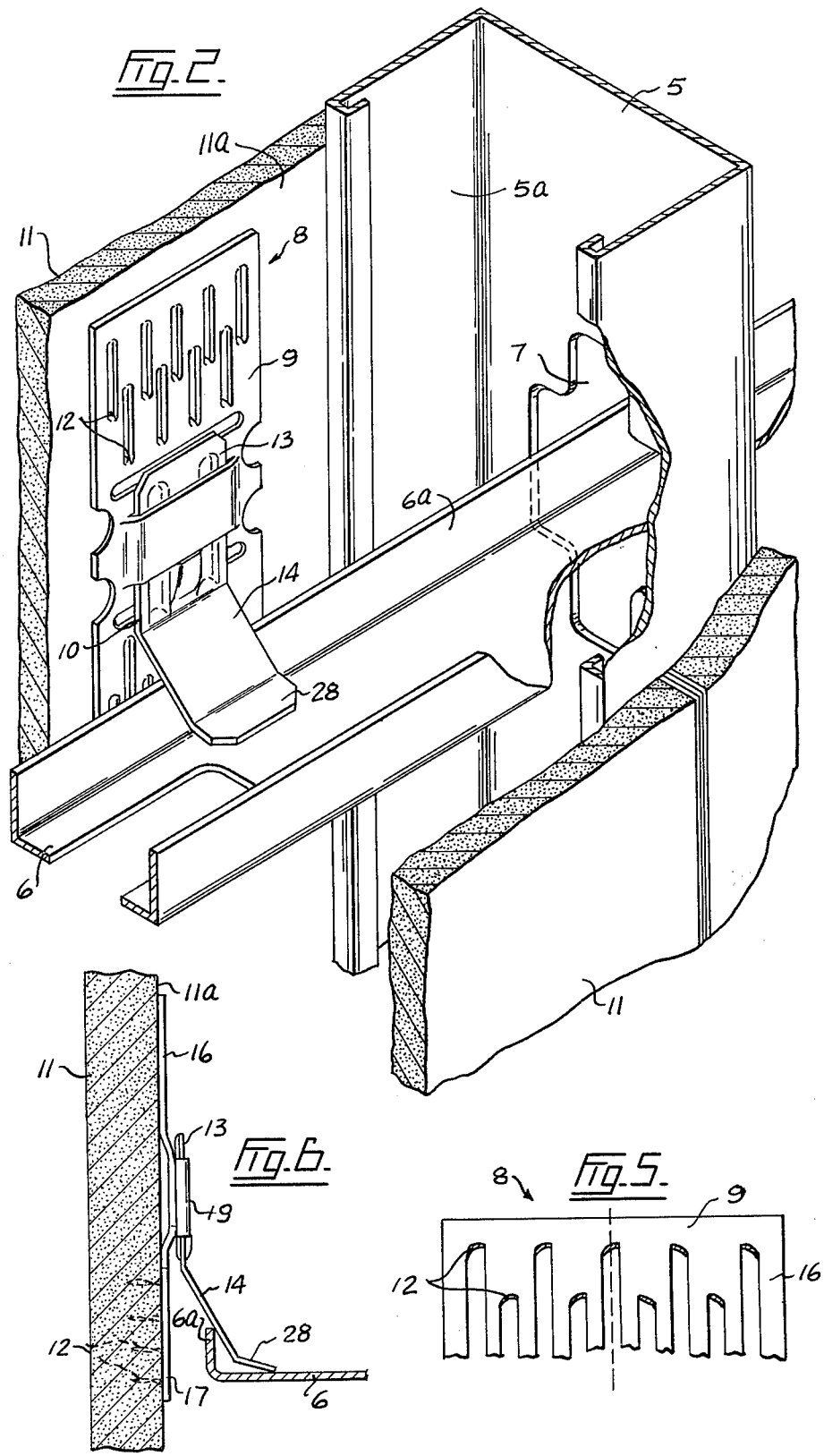

MODIFIED SUSPENSION ASSEMBLY FOR PARTITION PANEL

The present invention relates to a suspension assembly for suspending gypsum board panels from support structures.

In our Canadian Pat No. 1,002,279 we disclosed a system wherein gypsum board panels are suspended in side by side relationship from horizontal channel members by a plurality of suspension assemblies affixed to the rear of each panel. Vertical stud members in parallel spaced relationship carry the horizontal channel members. The suspension assemblies of this previously disclosed system comprise a gang nail plate comprising a plate having a plurality of non threaded tangs integral with the plate and projecting outwardly from one face of the plate, and a separate hanger member carried by the gang nail plate having a lower inclined portion projecting downwardly from the plate to co-operate with the horizontal channel member to draw the panel firmly against the vertical stud members. The plate is affixed to the panel by pushing the tangs into the panel.

This system has been found to be less than satisfactory since, when the suspension assembly is loaded with gypsum board panel, the hanger member tends to pry on the upper portion of the plate. This can result in the lower portion being pulled out of the board and eventually the entire plate being released from the board.

This problem has become more prevelent with the recent event of the gypsum industry taking economic measures in the manufacture of the gypsum board panels. Chemicals are often injected into the panels, reducing their weight from approximately 2800 lb to 2200 lb per 1000 sq. feet. This in turn creates a less dense medium riddled with air spaces and it becomes more difficult for the tangs of the suspension assembly to secure a grip sufficient to hold the load of the gypsum boards.

A suspension assembly was needed to overcome these problems associated with the prying loose of the suspension assembly under the load of the new gypsum board panels.

The suspension assembly of the present assembly is preferably designed for use with the support structure disclosed in our Canadian Pat No. 1,002,279. Briefly the structure comprises runner members mounted horizontally on a ceiling and a floor which receive spaced vertical stud members extending longitudinally between the runners to form a rigid framework. The studs have cutouts extending therethrough which are in horizontal alignment from one stud to the next. Horizontal, U-shaped channel members extend through the aligned cutouts.

Gypsum board panels are suspended side by side from this support structure to form a partition system. The suspension assemblies of the present invention are affixed to the rear of each panel and suspended from the horizontal channel members in order to suspend the gypsum board panels.

The present suspension assembly comprises a plate portion and a suspension clip, the plate portion having panel piercing tangs, protruding from its rear face, which are pressed into the gypsum board in order to affix the suspension assembly. The plate is designed to include transverse lines of weakness in the central neck portion which comprise transverse slots extending substantially across the width of the plate. The suspension clip is received in the neck portion in a manner to prevent upward movement of the clip past the neck portion of the pate. With this novel arrangement, the suspension assembly, when loaded with a gypsum board, will bend preferentially along the lines of weakness in a manner which pulls the central neck portion of the plate outwardly, while the upper and lower portions of the plate remain affixed to the gypsum board panel. Also, the suspension clip no longer levers against the upper portion of the plate. In this way the pivoting out of the lower portion of the plate is substantially eliminated.

The panel piercing tangs of the suspension assembly are preferably formed by punching portions of the plate rearwardly out of the plane of the plate. The tangs are further twisted such that they face inwardly toward the vertical centre of the plate. This arrangement has proven to give easy penetration of the tangs into the gypsum board and provide a secure gripping bond to the gypsum board.

Broadly stated a suspension assembly is provided for suspending a gypsum board panel from a support member of a support structure, said suspension assembly comprising:

a plate having upper and lower portions and a neck portion therebetween, a plurality of transverse lines of weakness in the neck portion comprising transverse slots extending substantially across the entire width of the plate and pairs of notch means cut into opposed side edges of the plate, each pair of notch means being substantially in alignment with a transverse slot, a plurality of panel piercing tangs on the upper and lower plate portions extending substantially normal to one face of the plate, and channel means formed by said neck portion having upper and lower open ends; and a suspension clip having upper and lower portions, and stop means therebetween, said upper portion being slidingly received in the channel means to engage the plate, said stop means being arranged to prevent upward extension of the upper clip portion past the neck portion of the plate, the lower clip portion overlying the lower plate portion, and said lower clip portion being inclined outwardly from the plane of the lower plate portion to engage the support member, whereby when the gypsum board panel is suspended from the support structure the load applied between the clip and the plate causes the neck portion of the plate to bend outwardly from the panel along said lines of weakness, while the upper and lower plate portions remain affixed to the panel.

The suspension assembly is shown in association with the support structure which is diclosed in our Canadian Pat. No. 1,002,279. While the support structure does not form part of the present invention it is diclosed here to demonstrate utility of the suspension assembly in a partition system.

IN THE DRAWINGS:

FIG. 1 is a fragmentary elevation of the wall with some of the panels removed to show the framework of the support structure.

FIG. 2 is a partly broken away, perspective view of a wall comprising gypsum board panels suspended from a support structure.

FIG. 3 is a front perspective view of the suspension assembly.

FIG. 4 is a rear perspective view of the suspension assembly.

FIG. 5 is a fragmentary rear view of the panel piercing tangs of the suspension assembly.

FIG. 6 is a vertical sectional view illustrating the manner in which the suspension assembly bends along the lines of weakness in use.

Turning to the drawings, the support structure is shown in FIG. 1. Ceiling runner 1 and floor runner 2 are fastened to the ceiling 3 and floor 4 respectively. Vertical stud members 5 are fitted in runners 1 and 2 in a laterally spaced relationship. Horizontal channel members 6 are laid into the vertical studs through cutouts 7. A plurality of suspension assemblies, designated generally by the numeral 8 and each having a plate portion 9 and a suspension clip 10, are affixed to the rear faces 11a of the gypsum board panels 11 in a manner which will be described below. As shown in the figure, the suspension clip 10 is engaged over the horizontal channel members 6 suspending the panels 11 from the support structure and allowing for the lateral adjustment of the affixed gypsum panels 11.

With reference to FIG. 2, the suspension assembly 8 is shown more clearly in relationship with the supporting structure. The plate 9 is affixed to the rear 11a of the gypsum board panels 11 by driving panel piercing tangs 12, which project rearwardly from the plate 9, into the panel 11. The suspension clip 10 shown as separate from plate 9 has upper portion 13 which is attached to the plate 9. A lower portion 14 of the clip 10 is inclined outwardly from the plane of the plate 9 such that it may extend over a side leg 6a of the horizontal channel member 6.

Thus to install the panels 11 onto the support structure, the panel 11 is lifted so as to engage clip 10 in the horizontal channel member 6. Likewise, the panel 11 is removed from the structure by lifting the panel upward to disengage the clip 10 from channel member 6. When the panel is suspended from the clips 10 it is held tight to the face 5a of the vertical studs. This results in the panel joints 15 being flat without one panel edge projecting outwardly beyond the other.

FIGS. 3 and 4 show the detailed construction of the suspension assembly 8. The plate 9 is of an elongate rectangular form having an upper portion 16, a lower portion 17, and a neck portion 18 therebetween. A plurality of panel piercing tangs 12 integral with the plate 9 project rearwardly from upper and lower plate portions 16 and 17. The tangs 12 are formed in transverse rows by punching the tangs 12 out of the plate 9. The tangs 12 are directed substantially perpendicular to the plane of the plate. The detail of FIGS. 4 and 5 show the tangs 12 to have a twisted conformation, the twist being directed toward the vertical centre of the plate 9 shown as a dotted line. This twisted conformation enables the plate 9 to attain a strong gripping bond with the gypsum board panels 11 when the tangs 12 are pushed into the panels 11. The twist also allows for easy penetration by the tangs 12 into the panel 11. Within the neck portion 18 of plate 9 is formed a channel 19 through which the upper portion 13 of clip 10 is received. Two parallel channel slots 20 are cut from the neck portion 18 of plate 9 to extend partially across the width of the plate 9. The part of the plate between the channel slots 20 is pressed out to form channel 19.

The neck portion 18 of the plate 9 is also provided with transverse lines of weakness formed by upper and lower transverse slots 21 and 22 respectively, extending substantially across the width of the plate 9, and upper and lower pairs of semicircular notches 23 and 24 respectively, which are substantially in alignment with transverse slots 21 and 22. Channel slots 20 are bounded above and below with upper and lower transverse slots 21 and 22 respectively.

The upper clip portion 13 is slidingly received in channel 19 and is provided with projecting ribs 25 arranged to engage the adjacent face of the plate 9. The channel 19 and the ribs 25 serve to attach the suspension clip 10 rigidly to the plate 9. Stop means 26 exist between the upper and lower clip portions 13 and 14 and engage the channel 19 to prevent the upward movement of the clip 10 past the upper transverse slot 21. As shown, the stop means 26 are formed by punching the stop out of the clip 10. Of course the bend 27 in the clip 10 resulting from the lower clip portion 14 being inclined outwardly from the plane of the plate 9 could also serve as the stop means. The lower clip portion 14 is further flared outwardly at 28 to facilitate engagement of the clip 10 with the horizontal channel member 6.

The manner in which the transverse lines of weakness act when the suspension assembly 8 is loaded with the gypsum board panels 11 in suspending arrangement is shown in FIG. 6. The load of the panel 11 placed on the suspension clip 10 is transmitted to the plate 9 causing the neck portion 18 to bend outwardly from the panel along the transverse lines of weakness while the upper and lower plate portions 16 and 17 remain affixed to the panel.

It will now be self evident that the upper clip portion 13 cannot extend upward past the neck portion 18 of the plate 9 since this would prevent the above described bending action about the upper line of weakness.

The above described bending action of the plate 9 together with the twisted conformation of the tangs 12 provide a secure bond between the plate 9 and the gypsum board panel 11.

The embodiments of the invention in which an exclusive property or privilege is claimed are defined as follows:

1. A suspension assembly for suspending a gypsum board panel from a support member of a support structure, said suspension assembly comprising:

a plate having upper and lower portions and a neck portion therebetween, a plurality of transverse lines of weakness in the neck portion comprising transverse slots extending substantially across the width of the plate and pairs of notch means cut into opposed side edges of the plate, each pair of notches being substantially in alignment with a transverse slot, a plurality of panel piercing tangs on the upper and lower plate portions extending substantially normal to one face of the plate, channel means formed by said neck portion having upper and lower open ends; and a suspension clip having upper and lower portions, and stop means therebetween, said upper portion being slidingly received in the channel means to engage the plate, said stop means being arranged to prevent upward extension of the upper clip portion past the neck portion of the plate, the lower clip portion overlying the lower plate portion, and said lower clip portion being inclined outwardly from the plane of the lower plate portion to engage the support member, whereby when the gypsum board panel is suspended from the support structure the load applied between the clip and the plate causes the neck portion of the plate to bend outwardly from the panel along said lines of weakness, while the upper and lower plate portions remain affixed to the panel.

2. The suspension assembly as set forth in claim 1 wherein:

the neck portion of the plate has upper and lower parallel channel slots extending across a portion of the width of the plate, the upper and lower channel slots respectively defining the upper and lower open ends of the channel, said channel slots being vertically spaced to leave a portion of the plate lying between the channel slots which is pressed outwardly from the plane of the plate to form the channel means, and the lines of weakness are located above and below the channel means.

3. The suspension assembly as set forth in claim 1 or 2 wherein:

the tangs are twisted inwardly toward a vertical centre of the plate.

* * * * *